No. 809,939. PATENTED JAN. 16, 1906.
E. J. GARVIN.
APPARATUS FOR RECOVERING PRECIOUS METALS.
APPLICATION FILED JUNE 16, 1905.
3 SHEETS—SHEET 2.
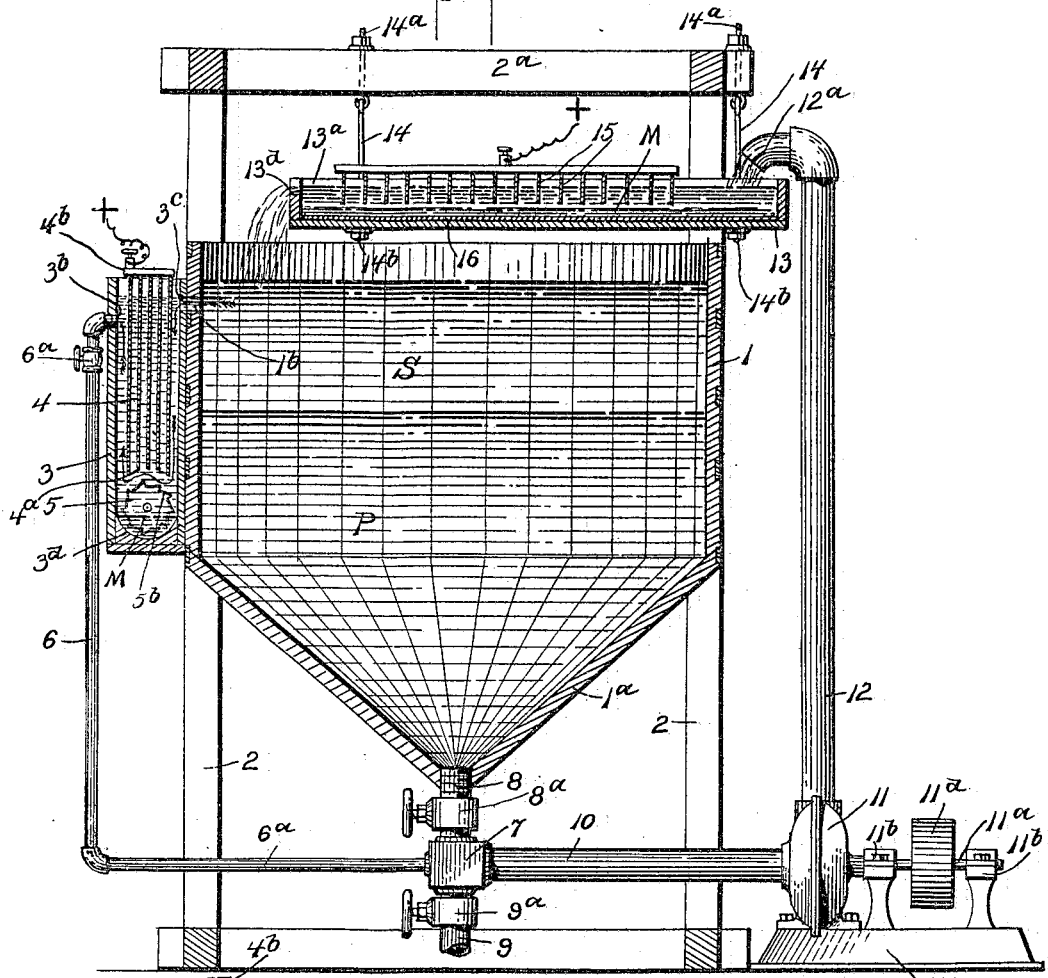
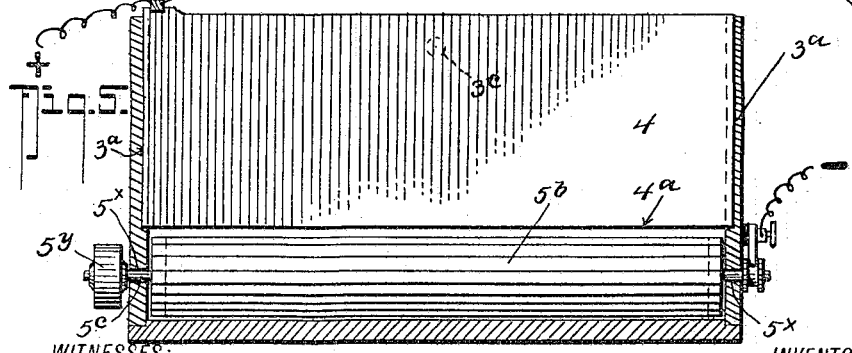
WITNESSES:
F. C. Gibson
John J. Schrott
INVENTOR
Edward J. Garvin.
BY
Fred G. Dieterich
ATTORNEYS.

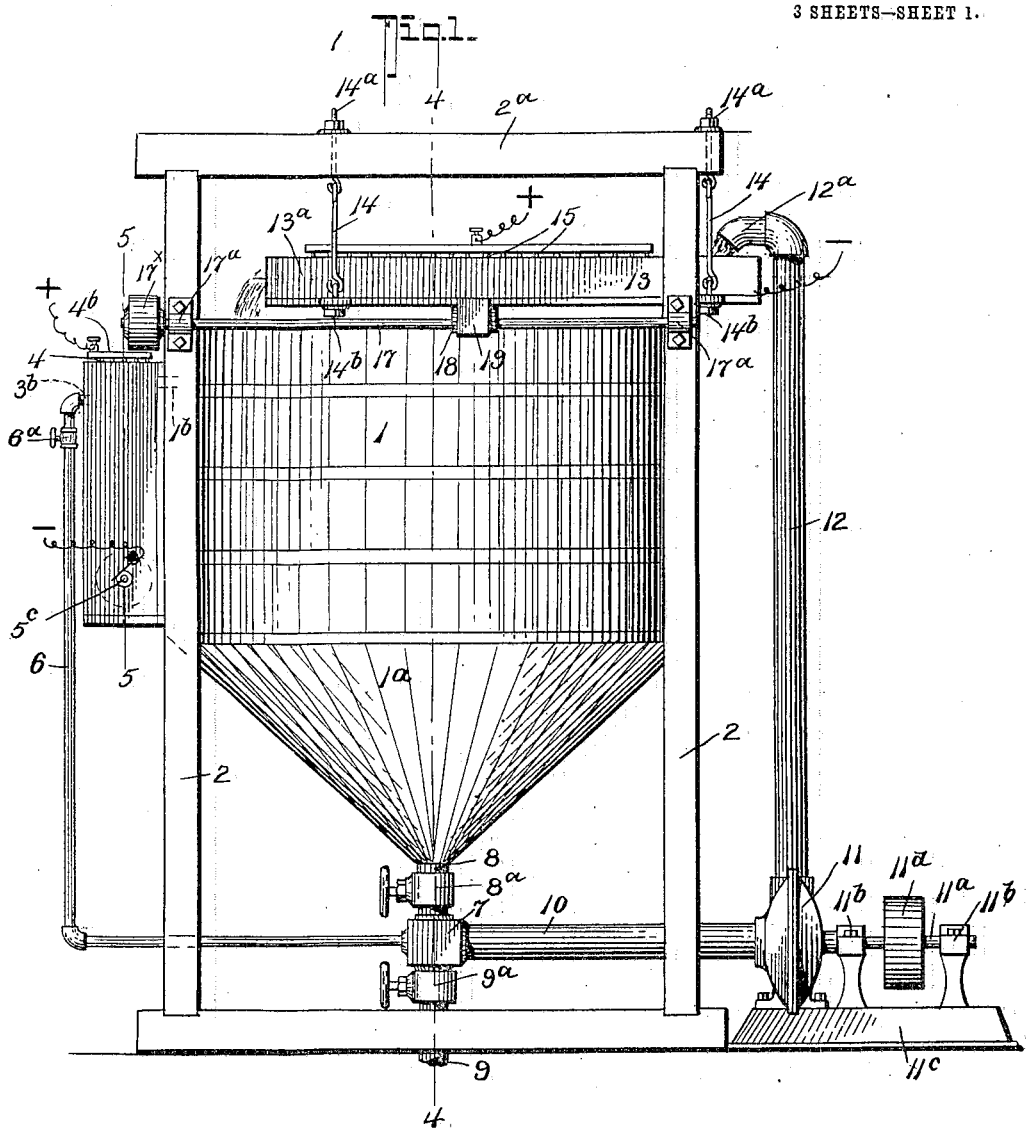

No. 809,939. PATENTED JAN. 16, 1906.
E. J. GARVIN.
APPARATUS FOR RECOVERING PRECIOUS METALS.
APPLICATION FILED JUNE 16, 1905.
3 SHEETS—SHEET 3.
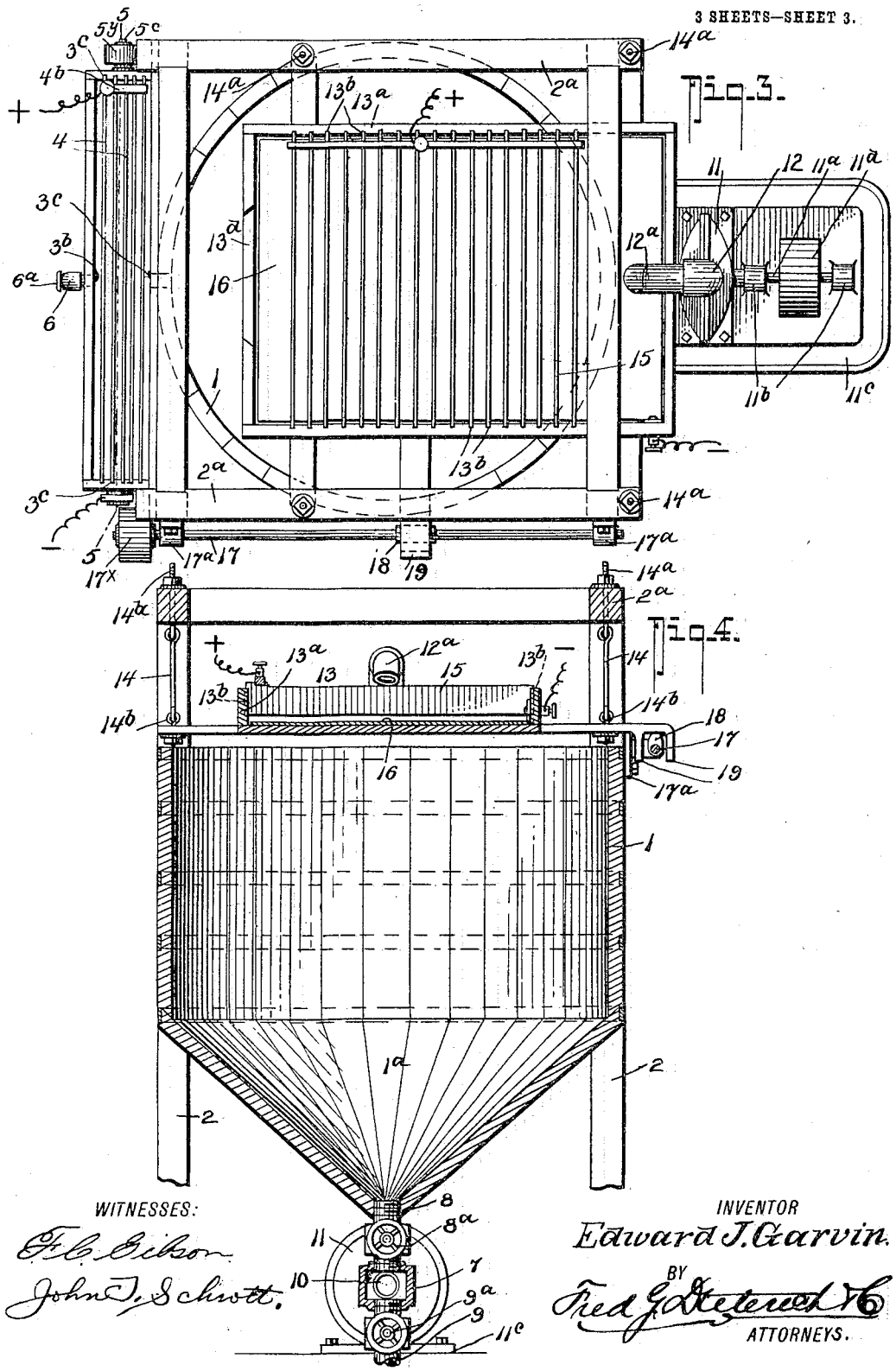

UNITED STATES PATENT OFFICE.

EDWARD J. GARVIN, OF PORTLAND, OREGON, ASSIGNOR TO GARVIN CYANIDE EXTRACTION COMPANY, A CORPORATION OF OREGON.

APPARATUS FOR RECOVERING PRECIOUS METALS.

No. 809,939.　　　　Specification of Letters Patent.　　　　Patented Jan. 16, 1906.

Application filed June 16, 1905. Serial No. 265,485.

*To all whom it may concern:*

Be it known that I, EDWARD J. GARVIN, residing at Portland, in the county of Multnomah and State of Oregon, have invented certain new and useful Improvements in Apparatus for Recovering Precious Metals, of which the following is a specification.

My invention relates to certain new and useful improvements in apparatus for recovering precious metals from ore solutions and ores; and in its generic nature the invention consists in the novel form of tank to receive the solution, together with supplemental tanks and agitating means for the solution, means for aerating the solution, and means for electrolytically depositing the precious metal, and means for amalgamating said metal, together with means for recovering by amalgamation the particles of coarse gold and silver that are not easily dissolved by the solution.

Primarily my invention has for its object to provide a simple apparatus wherein successful agitation, precipitation, and amalgamation may be carried on simultaneously, and thereby obviate the necessity of a large tankage system with devices for agitating and precipitating separately.

In its more detailed nature the invention consists in certain novel construction, arrangement, and combination of parts, all of which will be first described in detail and then specifically pointed out in the appended claims, reference being had to the accompanying drawings, in which—

Figure 1 is a side elevation of my apparatus. Fig. 2 is a vertical longitudinal section thereof. Fig. 3 is a top plan view of the apparatus. Fig. 4 is a cross-section on the line 4 4 of Fig. 1. Fig. 5 is a detail vertical section on the line 5 5 of Fig. 3. Fig. 6 is a detail perspective view of the cathode-roller of the precipitating-tank.

Referring now to the accompanying drawings, in which like numerals and letters of reference indicate like parts in all of the figures, 1 designates a receptacle or tank of preferably cylindrical shape with a conical bottom $1^a$, which tank 1 is mounted upon a suitable supporting-frame including the standards 2 2 and the cross beams or braces $2^a$, as shown. The tank 1 has an outlet $1^b$ near its surface and at one side thereof which communicates with the inlet $3^c$ of a supplemental tank 3, secured to the standards 2 2, as shown. The tank 3 forms what I shall hereinafter term the "precipitating-tank" of the apparatus, and consists of a rectangular body having a circular or concaved bottom $3^d$ and an outlet $3^b$ below the inlet $3^c$ and on the side opposite thereto. The end walls of the tank 3 are provided with vertical grooves $3^e$, spaced apart to receive the anode-plates 4 4, which are preferably constructed of sheet metal, such as iron and the like.

5 designates a drum-shaped cathode which consists of the end disks $5^a$, having ratchet-shaped peripheries to receive the longitudinal strips $5^b$ of copper or other suitable conducting and amalgamatable material. The disks $5^a$ $5^a$ are secured to a shaft $5^c$, which is mounted in bearings $5^x$ in the end walls of the precipitating-tank 3, and the said shaft $5^c$ passes to the outside of the tank 3 and is provided with a pulley $5^y$, by means of which the shaft $5^b$ can be driven from any suitable source of power.

The plates 4 are arranged with their lower edges $4^a$ to lie an equal distance from the cylindrical cathode 5, and the said plates 4 are electrically connected together, as at $4^b$, and are connected to the positive pole of a suitable source of electric energy. (Not shown.) The strips $5^b$ are so arranged with respect to the disks $5^a$ that they will lie approximately tangential to the periphery of the said disks.

6 designates an offtake-pipe which communicates with the outlet-aperture $3^b$ of the precipitating-tank 3 and which has a cut-off valve $6^a$, as shown. The pipe 6 extends downwardly and connects with a transverse pipe $6^a$, which communicates with a junction member 7, as shown.

8 designates a pipe connecting the junction member 7 with the outlet portion of the conical bottom $1^a$ of the tank 1, and the said pipe 8 is provided with a cut-off valve $8^a$ for a purpose presently to appear.

9 designates an offtake-pipe also connected with the junction member 7 and also provided with a cut-off valve $9^a$, the purpose of which will be presently understood.

10 designates a pipe of larger cross-sectional area, which pipe 10 connects to the junction member 7 and also to the centrifugal or other suitable pump 11, which is mounted on a base $11^c$ and has its shaft $11^a$ mounted in bearings $11^b$ and provided with a pulley $11^d$, by means of which the pump can be operated from any suitable source of power. (Not shown.)

12 designates a pipe which connects with the pump 11 and extends upwardly toward the top of the tank 1, and the said pipe 12 is provided with an outlet end $12^a$, which discharges into the amalgamating-tank 13. The tank 13, which I shall hereinafter term the "amalgamating-tank," is of rectangular shape and has its discharge $13^d$ at a point lower than the upper edges of the sides $13^a$ $13^a$, while the end opposite the discharge $13^d$ of the tank 13 is held directly beneath the outlet $12^a$ of the pipe 12.

14 designates a series of hook members suspended from the cross-braces $2^a$ $2^a$ by adjustable bolts $14^a$ $14^a$, which hook into similar bolts $14^b$ $14^b$ on the tank 13, so as to allow movement of the tank 13 in a manner which will be presently explained.

16 designates a metallic plate, preferably copper, which covers the bottom of the tank 13 and forms a cathode, which is electrically connected to the negative pole of the source of electric energy, as is also the cathode-cylinder 5 of the precipitating-tank 3.

The sides of the tank 13 are provided with vertical grooves $13^b$ $13^b$ to receive the anode-plates 15 15 of suitable material, and the said plates 15 are electrically connected to the positive terminal of the source of electric energy.

Mounted in suitable bearings $17^a$ $17^a$ on the standards 2 2 is a shaft 17, which has a drive-pulley $17^x$, by means of which motion may be imparted to the shaft 17 to turn the same in any approved manner. Upon the shaft 17 is secured a cam 18, which operates between finger or straddling members 19 19, secured to the tank 13, so that when the shaft 17 is rotated the tank 13 will receive a shaking motion from side to side to agitate the material within the tank for a purpose presently understood.

So far as described the manner in which my invention operates can be best explained as follows: The cathodes 5 and 16 are connected to the negative pole of a dynamo, or battery, or any suitable source of electric energy, while the anodes 4 and 15 are connected to the positive pole of such source of electric energy. A quantity of mercury M is then placed into the precipitating-tank 3, so that the lower part of the cylinder or roller 5 will be immersed therein. A quantity of mercury is also placed on the cathode-plate 16, and the amalgamator-tank 13 is so adjusted that the mercury will be level. A quantity of suitable pulp or pulverized ore is put into the tank 1, and a proper amount of solution is added thereto, (the pulp first having been treated for acid, if necessary.) Motion is then imparted to the roller 5 and the shaft 17 from any suitable source of power. The gravity of the pulp in the tank 1 will cause the pulp P to settle toward the bottom of the tank, so that the solution S near the top will be clearer and lighter. The valve $6^a$ is then opened and the clearer solution flows from the tank 1 into the tank 3 and follows a course indicated by the arrows in Fig. 2, through outlet $3^b$ into pipe 6, through pipe 10, pump 11, pipe 12, and amalgamator 13, backing into receptacle 1. As soon as the valve $6^a$ is opened the valve $8^a$ is also opened the desired amount to allow the pulp in the bottom of the tank 1 to flow out of the tank and mix with the lighter solution from the pipe 6, the solution from pipe 6 and the pulp from receptacle 1 mixing together and flowing through pipe 10 and pump 11 to pipe 12, from which it is discharged into the amalgamator 13. It should be understood that the pump 11 maintains the flow of the liquids in the pipes 6, 10, and 12. As the lighter solution from tank 1 passes into the separating-tank 3 the precious metals are precipitated upon the cathode 5 and the solution which flows out through the aperture $3^b$ into pipe 6 is substantially pure solvent. As the combined pulp and solution passes through pipes 10 and 12 and pump 11 the solution from pipe 6 mixes with the pulp and again dissolves the material that is fed from the receptacle 1 into the pipe 10, and this combined pulp and solution is passed out of the end $12^a$ of the pipe 12 into the amalgamator 13, as before intimated, through which it flows from the inlet end to the outlet end and through the outlet $13^d$ back into tank 1. As the pulp passes through amalgamator 13 the vibrations or shaking motion of the amalgamator keeps the pulp from packing in any part of the amalgamator, and the particles of gold or silver that are too coarse for the solution to quickly take up are amalgamated on the cathode 16. If the ore is of such nature that the action of an electric current in the amalgamator 13 will act upon the solution and pulp as to decompose the solution, the current is not used in the amalgamator 13; but if the current does not injure the solution then the current is permitted to flow from anode to cathode in the amalgamator 13, and thus add to the amalgamating process an electrolytic action, which will greatly aid the precipitation of the metal from the solution upon the cathode 16. The process, which is the continuous circulation of pulp and solution and the precipitation of valuable metal from the solution, is kept up until all the valuable metals are recovered. When the metals are all recovered from the solution and pulp, the solution and pulp within the apparatus are then drawn out by simply opening the valve $9^a$, it being understood that the valves $8^a$ and $6^a$ are likewise left open. A new charge can be then placed into the tank 1 and the process continued as before. Whenever it is desired to make a "clean up," the mercury M is drawn off from the separating-tank 3 and the amalgamator-tank 13 and the amalgam is cleaned off the cathodes 5 and 16 and retorted in the usual manner to obtain the ore in its pure state and separated from the mercury.

By using a tank for the pulp and solution with the outlet at the bottom and an outlet $3^a$ near the top below the solution-line a very large amount of pulp can be treated at one charge with a given-size tank and with a given amount of solution without clogging the pump, and for the reason that the valve $8^a$ can be opened so as to regulate the amount of thick pulp that is desired to flow out of the bottom of the tank 1. This pulp alone would be too thick for the pump to handle; but by opening the valve $6^a$ a sufficient amount of the lighter solution is mixed with the pulp in the pipe 10 and junction member 7 to make it the proper consistency for the pump to handle. By drawing off the thick pulp from the bottom of the tank 1 and mixing with it the lighter solution from the tank 3 a minimum amount of power is required to keep the whole in circulation and prevent the packing of the pulp in the tank 1, and by drawing off the heavy pulp at the bottom and mixing with it the lighter solution from the top the valves $8^a$ and $6^a$ can be so regulated that the violence of the agitation or swiftness of circulation of either pulp or solution can be regulated to suit any class or character of ore without varying the quantity of the pulp or solution. Again, it will be seen that by drawing off the lighter solution from the top the same is sufficiently free from the heavy pulp so that it does not clog in passing through the precipitating-tank 3, and by drawing off such solution from the top of the precipitating-compartment and passing it through the precipitating-compartment 3 the heavier particles within the tank 1 settle to the bottom and pass out through the pipe 8, so that they are continuously aerated without passing through the precipitating-compartment 3. From the foregoing it will be also seen that by drawing off the heavy pulp at the bottom of the tank 1 and the lighter solution at the top thereof and passing such lighter solution through the precipitating-compartment 3 the valuable metals are recovered by depositing them on the amalgamator-cathode by means of electricity without electrifying the whole charge. Again, in my apparatus the lighter solution is separated from the pulp and the valuable metals electrolytically deposited without electrifying the main body of pulp within the tank 1. The sulfids or concentrates in the pulp are not decomposed by the action of the electric current, which would change the chemical composition of the solution and destroy its power as a solvent. Again, by precipitating the valuable metals from the lighter solution by electrolytic action as it is drawn off from the top of the tank 1 the solution is regenerated before it passes into the pipe 6 and mixes with the pulp again in the pipe 10, so that the pulp at the point where it enters the pipe 10 is continuously receiving a large percentage of free cyanogen, and a weaker solution can therefore be used than is possible otherwise.

By constructing the cathode 5 as shown and described, with the copper strips arranged at an angle to the periphery of the disks $5^c$, the solution passes through said cathode, and both sides of the copper strips $5^b$ are in position to receive the metals as they are precipitated from the solution, thus giving a larger cathode-surface in a small space, and by arranging the cathode 5 to revolve with its lower part immersed in the mercury-bath M the copper strips $5^b$ are freshly amalgamated through every revolution thereof and a clean surface is always presented to receive the precipitated metals, and by revolving the cathode 5, as described, with its lower part in the mercury, the strips $5^b$ are continuously being cleaned and a stronger current can be used than would be otherwise practicable. The metal strips 4, which are the anodes and are held above the cathode 5 by being placed in the grooves $3^a$ of the tank 3, give a large cathode-surface in a small space and compel the solution to follow the course indicated by the arrows, the central plate having its upper edge in a plane above the inlet $3^a$, as shown, thus allowing the solution to be brought into closer proximity with the cathode 5 during the operation of the apparatus.

The metal which is too coarse for the solution to dissolve quickly is by the action of the gravity and vibrations of the amalgamating-tank 13 brought into contact with the amalgamator-cathode 16 and there retained in the form of an amalgam, and should the nature of the ore be such that it will not be decomposed by the electric current, and thereby injure the solution, the current is permitted to flow from the anodes 15 to cathodes 16 in the amalgamator-tank 13, permitting the metal to be deposited in the amalgamator 13 by electrolytic action, similar to the deposition which takes place in the separating-tank 3.

By making the discharge $13^d$ in a plane higher than the lower edges in the plates 15 in the amalgamator-tank 13 the same forms a trap, so that all parts of the pulp come into contact with the cathode 16, and the height of the discharge from the amalgamating-tank 13 is such that the flow of the solution and pulp will not force the mercury and amalgam from the cathode 16, the flow of the liquid being mitigated and steadied by the plates 15.

From the foregoing it will be seen that I have provided an apparatus which as a whole consists of a tank into which the finely crushed or pulverized metal is placed, together with a cyanid or any other suitable solution which is an electrolyte and a solvent for precious metals contained in ore with means for agitating and aerating the same and at the same time recovering the coarse gold contained therein by amalgamation, separating the solution from the larger portion of the ore-pulp, recovering the valuable metals from it in the form of amalgam, and returning the solution again to the ore-pulp, so that it may continue its work as a solvent for the precious metals and making the process continuous until all the precious metals have been recovered in the form of amalgam.

From the foregoing description, taken in connection with the accompanying drawings, it is thought the complete construction, operation, and many advantages of my invention will be readily understood by those skilled in the art to which it appertains.

Having thus described my invention, what I claim, and desire to secure by Letters Patent, is—

1. In an apparatus of the class described, the combination with a main tank for receiving the pulverized ore and solvent, of a separating-tank including means for separating the material, attached to the main tank near its top, and an amalgamating-tank including means for amalgamating the material suspended above the main tank, and means for causing a continuous circulation of the materials and solution through said tanks.

2. In an apparatus of the class described, the combination with a main tank to receive the pulverized ore and the solution, of a separating-tank including means for separating the materials in communication with the upper portion of the main tank, an amalgamating-tank including means for amalgamating the material arranged to discharge into the main tank, means for drawing the lighter solution through the separating-tank from the main tank and for drawing the pulverized material from the main tank and mixing it with the solution drawn from the separating-tank and forcing such mixture into the amalgamating-tank, substantially as shown and described.

3. In an apparatus of the class described, the combination with a main tank to receive the pulverized ore and the solution, of a separating-tank in communication with the upper portion of the main tank, an amalgamating-tank arranged to discharge into the main tank, means for drawing the lighter solution through the separating-tank from the main tank and for drawing the pulverized material from the main tank and mixing it with the solution drawn from the separating-tank and forcing such mixture into the amalgamating-tank, means within the separating-tank for separating the metal from the solution and means within the amalgamating-tank for separating the metal from the solution and ore, substantially as shown and described.

4. In an apparatus of the class described, the combination with a main tank to receive the pulverized ore and the solution, of a separating-tank in communication with the upper portion of the main tank, an amalgamating-tank arranged to discharge into the main tank, means for drawing the lighter solution through the separating-tank from the main tank and for drawing the pulverized material from the main tank and mixing it with the solution drawn from the separating-tank and forcing such mixture into the amalgamating-tank, means within the separating-tank for separating the metal from the solution and means within the amalgamating-tank for separating the metal from the solution and ore, and means for agitating the amalgamating-tank, substantially as shown and described.

5. In an apparatus of the class described, the combination with a main tank for receiving the pulverized ore and the solution, of a separating-tank, said separating-tank having an inlet in communication with the main tank near the upper portion thereof, and having an outlet in the plane below the inlet of the separating-tank, a plurality of partitions within said separating-tank, said separating-tank having a concaved bottom, a rotatable cylindrical member mounted for rotation within the bottom of said separating-tank, said partitions adapted to be connected to the positive pole of a source of electric energy, said cylindrical member adapted to be connected to the negative pole of a source of electric energy, a valved offtake-pipe communicating with the outlet of the separating-tank, a pump in communication with said valved offtake-pipe of the separating-tank, a valved offtake-pipe for said main tank also in communication with said pump, an amalgamating-tank arranged to discharge into said main tank, a pipe connection from said pump adapted to discharge into said amalgamating-tank, and means within said amalgamating-tank for extracting the metal from the material therein by amalgamation, substantially as shown and described.

6. In an apparatus of the class described, the combination with a main tank for receiving the pulverized ore and the solution, of a separating-tank, said separating-tank having an inlet in communication with the main tank near the upper portion thereof, and having an outlet in the plane below the inlet of the separating-tank, a plurality of partitions within said separating-tank, said separating-tank having a concaved bottom, a rotatable cylindrical member mounted for rotation within the bottom of said separating-tank, said partitions adapted to be connected to the positive pole of a source of electric energy, said cylindrical member adapted to be connected to the negative pole of a source of electric energy, a valved offtake-pipe communicating with the outlet of the separating-tank, a pump in communication with said valved offtake-pipe of the separating-tank, a valved offtake-pipe for said main tank also in communication with said pump, an amalgamating-tank arranged to discharge into said main tank, a pipe connection from said pump adapted to discharge into said amalgamating-tank, and means within said amalgamating-tank, for extracting the metal from the material therein by amalgamation, and means within the separating-tank for extracting the metal from the solution within the tank by amalgamation, substantially as shown and described.

7. In an apparatus of the class described, the combination with a main tank for receiving the pulverized ore and the solution, of a separating-tank, said separating-tank having an inlet in communication with the main tank near the upper portion thereof, and having an outlet in the plane below the inlet of the separating-tank, a plurality of partitions within said separating-tank, said separating-tank having a concaved bottom, a rotatable cylindrical member mounted for rotation within the bottom of said separating-tank, said partitions adapted to be connected to the positive pole of a source of electric energy, said cylindrical member adapted to be connected to the negative pole of a source of electric energy, a valved offtake-pipe communicating with the outlet of the separating-tank, a pump in communication with said valved offtake-pipe of the separating-tank, a valved offtake-pipe for said main tank also in communication with said pump, an amalgamating-tank arranged to discharge into said main tank, a pipe connection from said pump adapted to discharge into said amalgamating-tank, means within said amalgamating-tank for extracting the metal from the material therein by amalgamation, and means within the amalgamating-tank for electrolytically extracting the metal from the material within the tank substantially as shown and described.

8. In an apparatus of the class described, a main tank or receptacle, a separating-tank having separating means in communication with the main tank near its top, and an amalgamating-tank having means for amalgamating the material, suspended above the main tank, said main tank adapted to receive ore and solvent, said ore and solvent adapted to separate in said main tank into lighter and heavier strata to permit drawing off the heavier strata and the lighter strata separately, means for drawing off the contents of the main tank, circulating, agitating and passing the lighter strata through the precipitating or separating tank and returning the same to the heavier strata, while simultaneously drawing the heavier strata from the bottom of the main tank and passing it back into the amalgamating-tank, substantially as shown and described.

9. In an apparatus of the class described, the combination with a main tank adapted to receive the ore and the solvent, said ore and solvent adapted to separate into lighter and heavier strata in said main tank, a separating-tank in communication with said main tank at a point in line with the lighter material, means within said separating-tank for separating the metal from its solution, means for drawing off the spent solvent from the separating-tank after the metal has been separated therefrom, and for drawing off the heavier material from the main tank and mixing said spent solvent with said heavier material to cause it to dissolve said heavier material and for forcing said solution of heavy material and solvent back into the main tank, substantially as shown and described.

10. An apparatus of the class described, a main tank adapted to receive the ore and solvent, a separating-tank having an inlet in communication with the main tank at a point near its top, means within said separating-tank for separating the ore from its solution as the solution passes therethrough, an outlet for said separating-tank, an outlet for said main tank near the bottom thereof, a pipe connected with the outlet from the separating-tank and the lower outlet from the main tank to receive the discharged materials from the main tank and the separating-tank, an amalgamating-tank arranged above the separating-tank and adapted to discharge into said separating-tank, means connected with said pipe which receives the discharge from the main and separating-tanks for forcing the combined materials into the amalgamating-tank, and means in the amalgamating-tank for separating the metal from its ore and solution, substantially as shown and described.

11. An apparatus of the class described, a main tank adapted to receive the ore and solvent, a separating-tank having an inlet in communication with the main tank at a point near its top, means within said separating-tank for separating the ore from its solution as the solution passes therethrough, an outlet for said separating-tank, an outlet for said main tank, near the bottom thereof, a pipe connected with the outlet from the separating-tank and the lower outlet from the main tank to receive the discharged material from the main tank and the separating-tank, an amalgamating-tank arranged above the separating-tank and adapted to discharge into said separating-tank, means connected with said pipe which receives the discharge from the main and separating tanks for forcing the combined materials into the amalgamating-tank, means in the amalgamating-tank for separating the metal from its ore and solution, and means for agitating said separating-tank.

12. An apparatus of the class described, a main tank adapted to receive the ore and solvent, a separating-tank having an inlet in communication with the main tank at a point near its top, means within said separating-tank for separating the ore from its solution as the solution passes therethrough, an outlet for said separating-tank, an outlet for said main tank near the bottom thereof, a pipe connected with the outlet from the separating-tank and the lower outlet from the main tank to receive the discharged materials from the main tank and the separating-tank, an amalgamating-tank arranged above the separating-tank and adapted to discharge into said separating-tank, means connected with said pipe which receives the discharge from the main and separating tanks for forcing the combined materials into the amalgamating-tank, means in the amalgamating-tank for separating the metal from its ore and solution, said means for separating the metal from its solution into the separating-tank comprising an amalgamating material, and electrolytic separating devices.

13. An apparatus of the class described, a main tank adapted to receive the ore and solvent, a separating-tank having an inlet in communication with the main tank at a point near its top, means within said separating-tank for separating the ore from its solution as the solution passes therethrough, an outlet for said separating-tank, an outlet for said main tank near the bottom thereof, a pipe connected with the outlet from the separating-tank and the lower outlet from the main tank to receive the discharged material from the main tank and the separating-tank, an amalgamating-tank arranged above the separating-tank and adapted to discharge into said separating-tank, means connected with said pipe which receives the discharge from the main and separating tanks for forcing the combined materials into the amalgamating-tank, means in the amalgamating-tank for separating the metal from its ore and solution, said means for separating the metal from its solution into the separating-tank comprising an amalgamating material and electrolytic separating devices, and said separating means within the amalgamating-tank comprising an amalgamating material and supplemental electrolytic devices substantially as shown and described.

14. An apparatus of the class described comprising in combination a supporting-frame, a main tank mounted thereon said tank having a conical bottom and a valved outlet, a junction member into which said valved outlet of the main tank discharges, a valved offtake for said junction member, a separating-tank mounted on said supporting-frame and having an inlet in communication with the main tank near its top and an outlet at a point below its inlet, said separating-tank having its sides provided with a plurality of grooves, a plurality of metal plates held in said grooves and forming anodes, a cathode mounted in said separating-tank below said anodes, said cathode comprising a cylindrical member consisting of end disks, metallic strips connecting said end disks together, said cathode being rotatably mounted in said separating-tank, said separating-tank having a concaved bottom adapted to receive mercury to cover the lower portions of said cathode, a valved pipe connection communicating with said junction member and the outlet of said separating-tank, an amalgamating-tank loosely mounted on said supporting-frame above said main tank and having a discharge-outlet adapted to discharge into said main tank, said amalgamating-tank having its sides provided with grooves, a plurality of metallic plates held in said grooves to form anodes, the lower edges of said plates being held in a plane below the upper edge of the outlet of said amalgamating-tank to form a trap, a metal plate within said amalgamating-tank below said last-named plates and forming a cathode, said amalgamating-tank adapted to contain mercury, a pump in connection with said junction member, and arranged to pump the material from said junction member into said amalgamating-tank, and means mounted on the supporting-frame and in connection with the amalgamating-tank for agitating the same, substantially as shown and described.

15. In an apparatus of the class described, the combination with a main tank adapted to receive ore and solvent to permit the same to separate into lighter and heavier strata, a separating or precipitating tank in communication with said main tank at a point in line with the lighter material, and an amalgamating-tank arranged to discharge into the main tank, means within said separating-tank for separating the material from its solution, means for drawing off the spent solvent from the separating-tank after the metal has been separated therefrom, and for drawing off the heavier material from the main tank to mix the spent solvent with the heavier material and for forcing said mixture of solvent and heavy material back into the amalgamating-tank and into the main tank, all being arranged substantially as shown and described.

16. In an apparatus of the class described, the combination with a separating-tank, an amalgamating-tank and a main tank adapted to receive ore and solvent which is adapted to separate into lighter and heavier strata during the process of agitation or circulation in said main tank for separating the solvent from ore, to pass the same through the separating or precipitating tank at a point in line with the lighter material, means within said separating-tank for separating the material from its solution, means for drawing off the spent solvent from the separating-tank after the metal has been separated therefrom, and after drawing off the heavier material from the main tank to mix the spent solvent therewith and for forcing said mixture of heavy material and ore back into the amalgamating-tank and into the main tank, substantially as shown and described.

EDWARD J. GARVIN.

Witnesses:
R. W. WILBUR,
LOTUS L. LANGLEY.